Dec. 7, 1926.

E. B. JARVIS

INTENSIFIER

Filed Sept. 13, 1923

1,609,476

Inventor.
E. Beaumont Jarvis.
by H. J. S. Dennison
atty.

Patented Dec. 7, 1926.

1,609,476

UNITED STATES PATENT OFFICE.

EDGAR BEAUMONT JARVIS, OF BELLEVILLE, ONTARIO, CANADA, ASSIGNOR TO HERBERT C. JARVIS, OF TORONTO, ONTARIO, CANADA.

INTENSIFIER.

Application filed September 13, 1923. Serial No. 662,588.

The objects of this invention are to produce a simple and efficient apparatus which may be economically installed and which will ensure positive operation.

A further object is to devise a structure which will enable adjustment of the tension.

The principal features of the invention consist in the novel construction of the main valve and of the means whereby the pressure on such valve may be regulated to suit requirements.

A further important feature consists in the novel arrangement of circulation passages whereby the installation is greatly simplified and the cleaning or reseating of the valves is facilitated.

In the drawings Figure 1 is a longitudinal sectional view of my improved intensifier.

Figure 1:
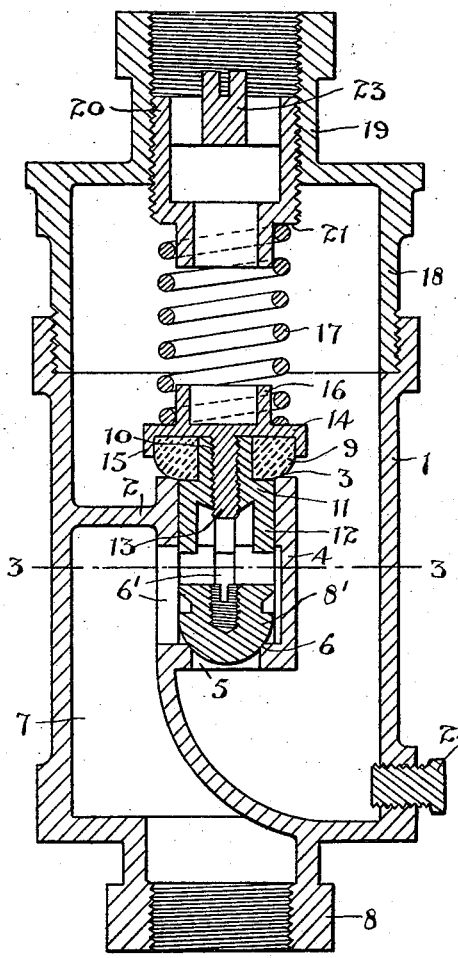
Figure 2:
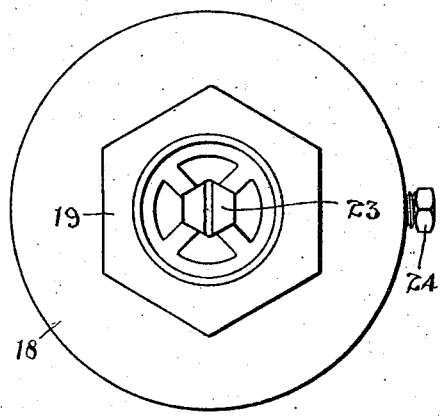
Figure 2 is a top plan view of the device.
Figure 3:
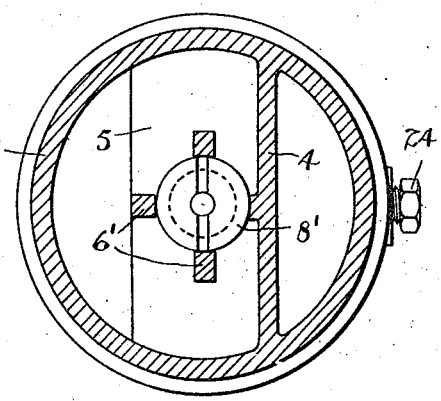
Figure 3 is a cross section on the line 3—3 of Figure 1.
Figure 4:
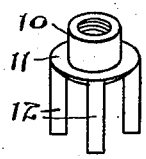
Figure 4 is a perspective detail of the lower valve holding member.

In the construction herein shown the cylindrical casing 1 is divided intermediate of its length, the parts being threaded together. In the lower portion of the casing a zig-zag partition formed integral with the walls is formed with a horizontal portion 2 having a raised valve seat 3 arranged in the vertical axis. The partition extends downward from the outward side of the valve seat in a vertical portion 4, connecting with a horizontal portion 5 returning beneath but spaced from the portion 2 and in this portion 5 is a valve seat 6 in axial alignment with the seat 3. The partition then sweeps downward curving outward to the bottom of the casing leaving a passage 7 connecting with the inlet nipple 8 and communicating with the valve seats 3 and 6 from the bottom and top respectively. A plurality of vertical guides 6′ extend between the horizontal portions 2 and 5 being spaced around the valve seat 6.

A valve 8′ with a spherical under face rests on the seat 6 and closes the passage through the seat 6. The valve is formed with a peripheral groove and slides freely in the guides 6′, the groove preventing the valve from sticking.

The upper seat 3 is closed by a rubber valve ring 9 which is mounted on the cylindrical centre 10 of a metal disc 11 which is provided with parallel legs 12 having sliding engagement with the cylindrical passage 13 to the valve seat 3. The disc 11 is threaded to receive a threaded stem 13 centrally arranged in a cup 14 which has a flange 15 surrounding the periphery of the valve ring 9. This flange holds the rubber valve from spreading and the centre 10 limits the movement of the members and prevents the squeezing of the ring 9 too tightly so as to distort the shape thereof.

A flange 16 extends upwardly from the cup 14 and supports a coiled compression spring 17.

The upper section 18 of the casing 1 is provided with an axially arranged nipple 19 threaded internally and in this nipple is threaded the hollow member 20 which is open through the centre and is provided with a shoulder 21 to receive the top end of the spring 17. The member 20 is formed with a spider and a central slotted stem 23 by means of which said member 20 is adjusted. The adjustment of the member 20 regulates the pressure of the spring against the valve so that any desirable resistance to the expansion of the water in the system may be obtained.

In the operating of hot water systems it is desirable to maintain the circulation water under pressure which results in better heating conditions and to accomplish the desired result the intensifier is interposed between the system and the expansion tank.

When the water is heated it expands and forces the valve 9 upwardly against the pressure of the spring which of course can be set to any desired tension by the adjustment of the member 20.

The water thus forced past the valve flows to the expansion tank and upon the water in the system cooling the excess in the expansion tank returns through the valve seat 6 lifting the small valve 8′.

A clean out plug 24 is arranged at the bottom of the casing 1 to clear any sediment from the system.

What I claim as my invention is:—

An intensifier comprising a cylindrical casing having an axially arranged inlet opening in the bottom, partitions separating said inlet opening from the upper interior of said cylindrical casing, axially arranged seats in said partitions, valves closing said seats, an internally threaded annular shoulder at the upper end of said cylindrical casing, an upper cylindrical casing having one end of its wall threaded to engage said threaded annular shoulder and having its other end reduced and threaded internally and axially thereof, a compression spring resting on one of said valves and extending axially upwards into said upper casing, and a hollow member adjustably threaded in said internally threaded reduced end of said upper casing and engaging the upper end of said compression spring.

EDGAR BEAUMONT JARVIS.